United States Patent [19]
Milanowski et al.

[11] Patent Number: 6,046,406
[45] Date of Patent: *Apr. 4, 2000

[54] SEALED CABLE JOINT BOX

[75] Inventors: Michel Milanowski, Anserville; Alain Vincent, Juilly, both of France

[73] Assignee: Alcatel Cable Interface, Vrigne Aux Bois, France

[ * ] Notice: This patent issued on a continued prosecution application filed under 37 CFR 1.53(d), and is subject to the twenty year patent term provisions of 35 U.S.C. 154(a)(2).

[21] Appl. No.: 08/856,243

[22] Filed: May 14, 1997

[30] Foreign Application Priority Data

May 15, 1996 [FR] France .................... 96 06076

[51] Int. Cl.$^7$ .................................................. H02G 15/02
[52] U.S. Cl. ........................................ 174/77 R; 174/94 S
[58] Field of Search ....................... 174/77 R, 79, 174/82, 76, 88 R, 92, 93, 97

[56] References Cited

U.S. PATENT DOCUMENTS

| | | | |
|---|---|---|---|
| 3,844,573 | 10/1974 | Wright et al. | 277/216 |
| 4,095,044 | 6/1978 | Horsma et al. | 174/77 R X |
| 4,267,401 | 5/1981 | Wilkinson | 174/77 R |
| 4,332,975 | 6/1982 | Dienes | 174/76 |
| 5,007,701 | 4/1991 | Roberts | 174/93 X |
| 5,331,114 | 7/1994 | Rudolph | 174/93 |

FOREIGN PATENT DOCUMENTS

| | | |
|---|---|---|
| 0257896A2 | 3/1988 | European Pat. Off. . |
| 3512165A1 | 10/1985 | Germany . |
| 2261960A | 6/1993 | United Kingdom . |
| WO9502267 | 1/1995 | WIPO . |

Primary Examiner—Kristine Kincaid
Assistant Examiner—William H. Mayo III
Attorney, Agent, or Firm—Sughrue, Mion, Zinn Macpeak & Seas, PLLC

[57] ABSTRACT

A sealed cable joint box has a body closed by a lid, cable apertures between the body and the lid, a first flexible and deformable seal for sealing the cables in each aperture and a second flexible and deformable seal between the body and the lid, this second seal being rendered discontinuous by the apertures and formed of independent segments between the apertures. Each segment of the second seal has each of its terminal portions embedded in the first seal in the aperture at this level and has a greater hardness than the first seal.

18 Claims, 5 Drawing Sheets

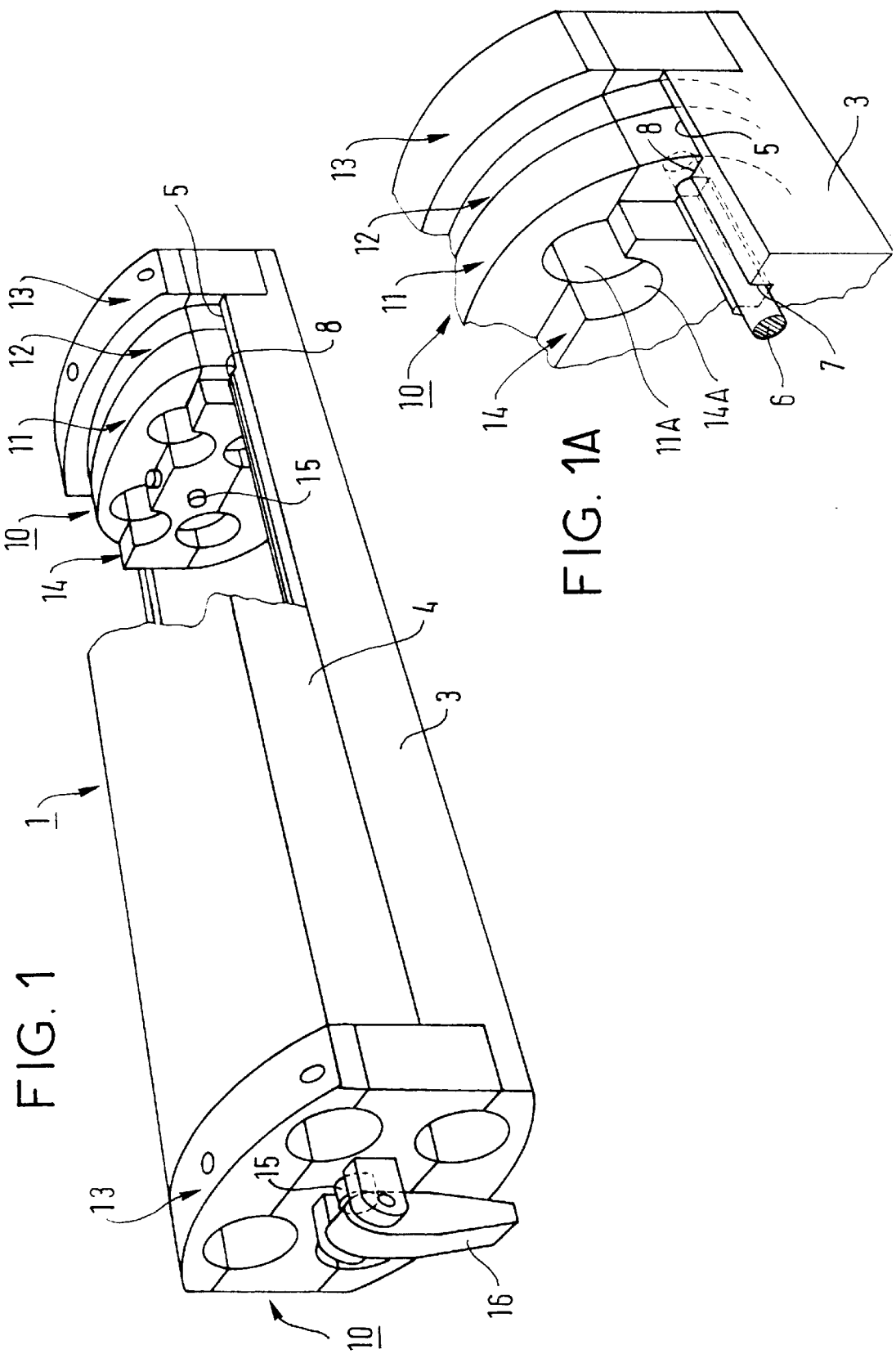

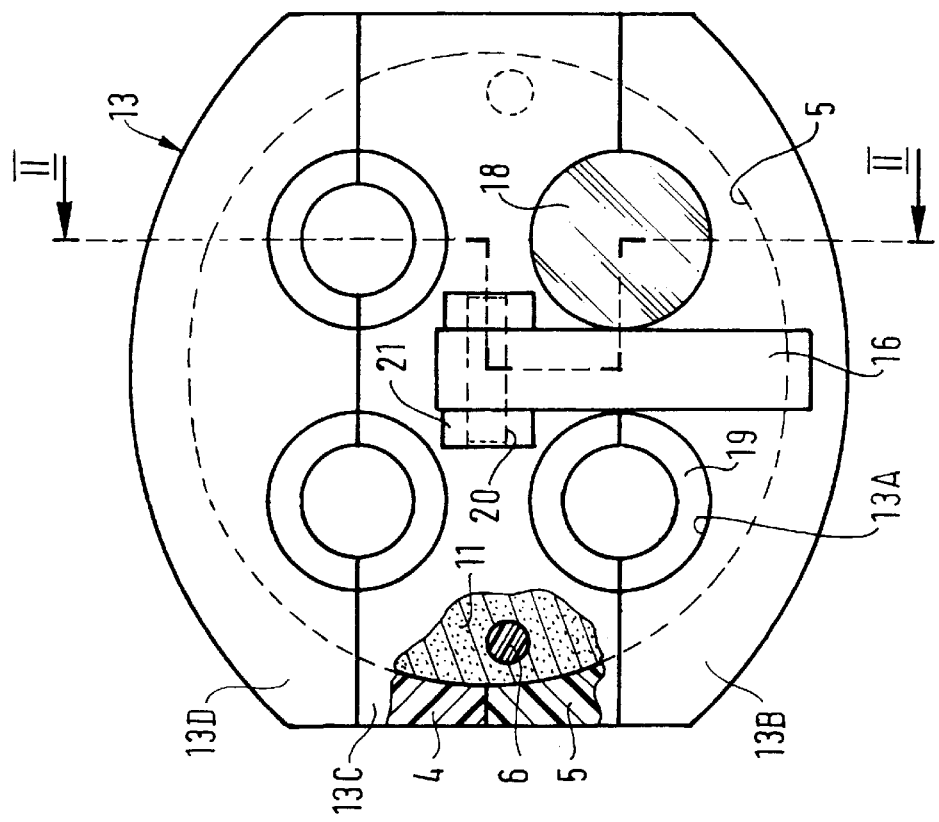
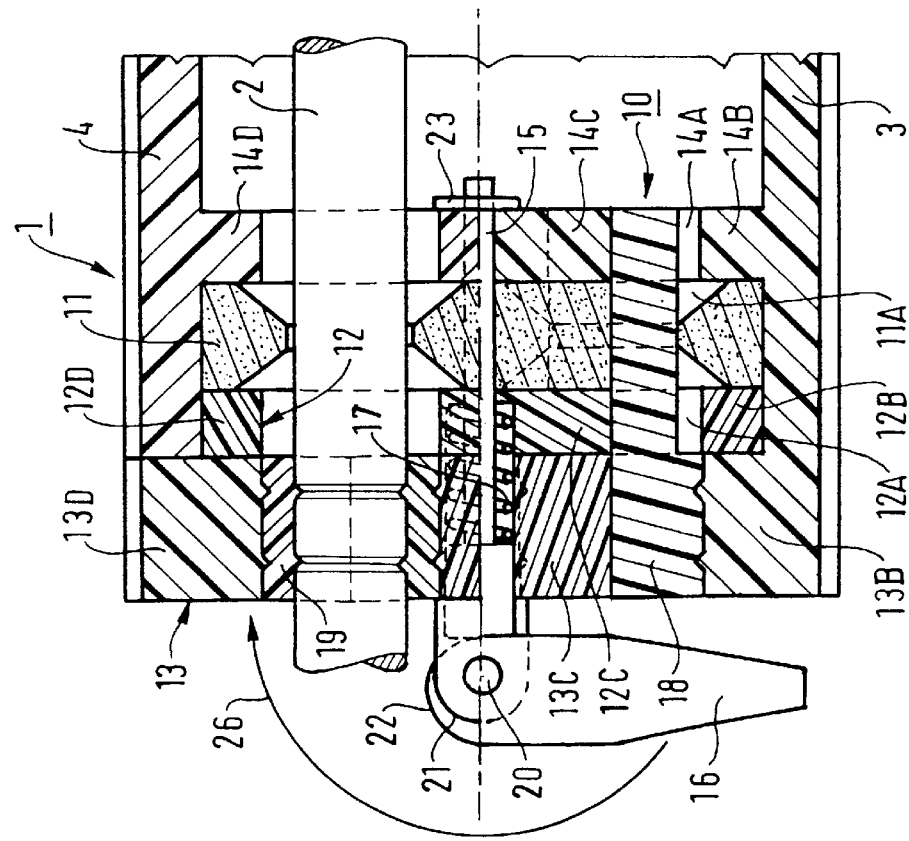

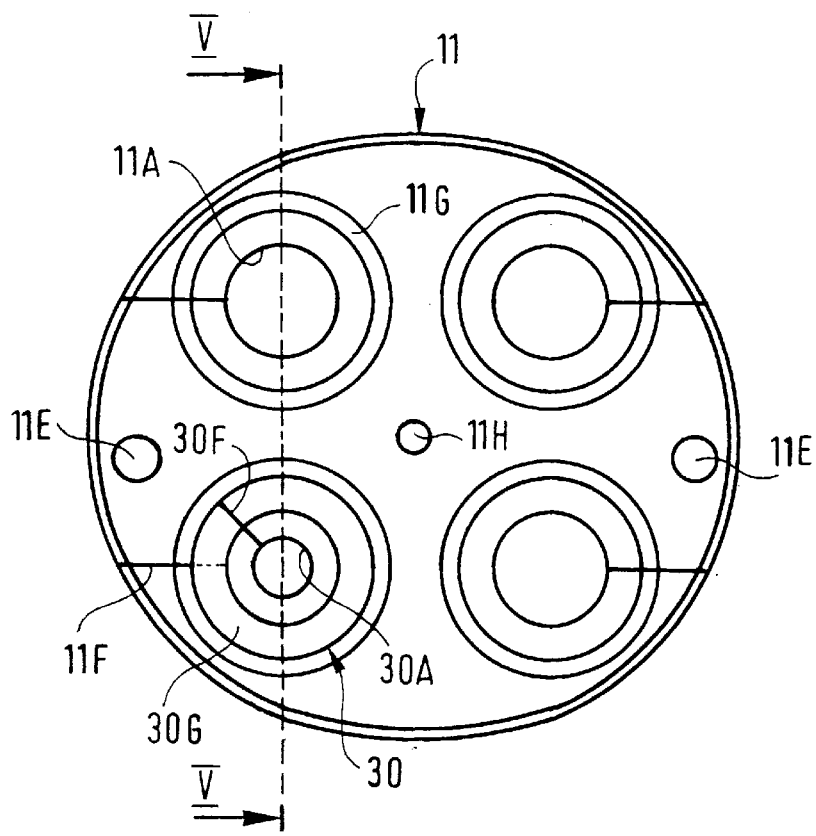
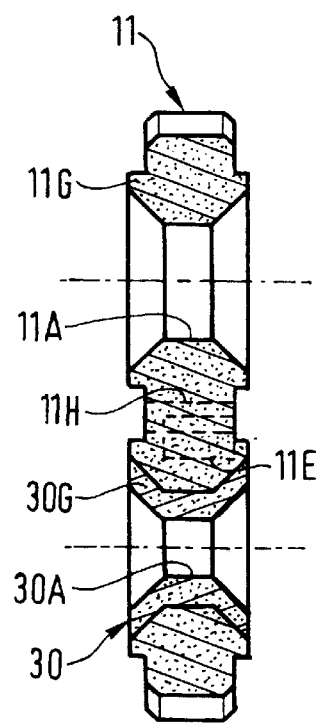
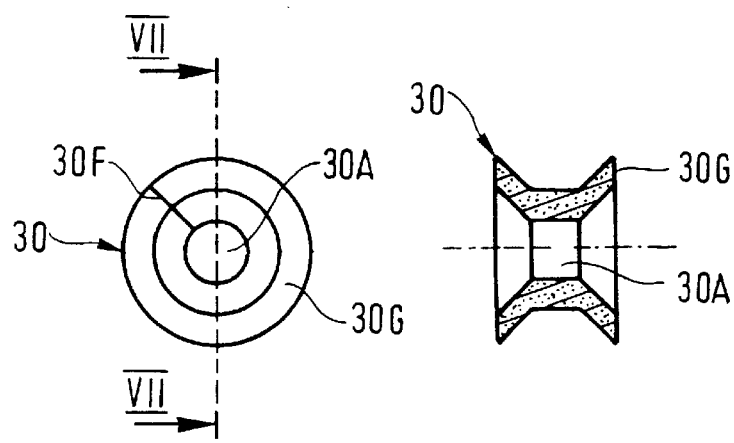
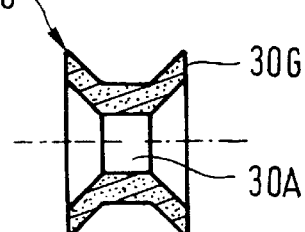

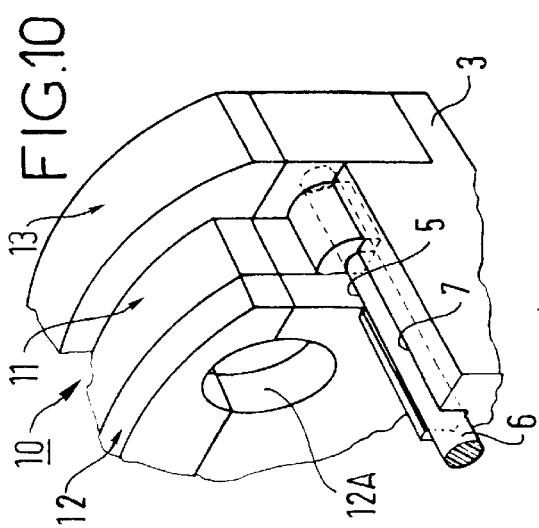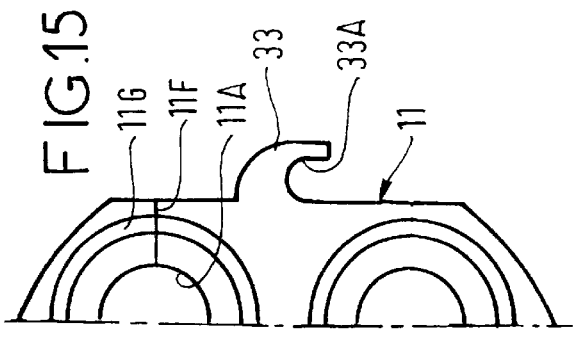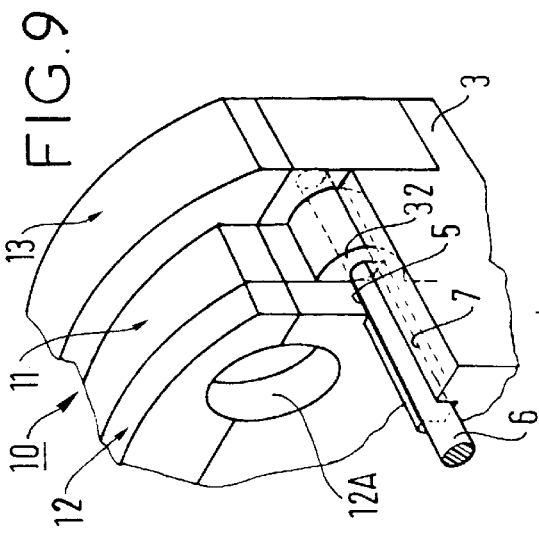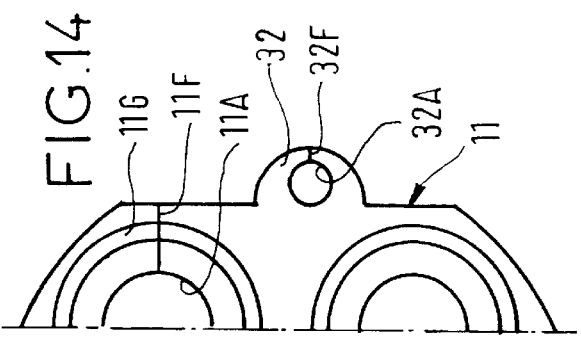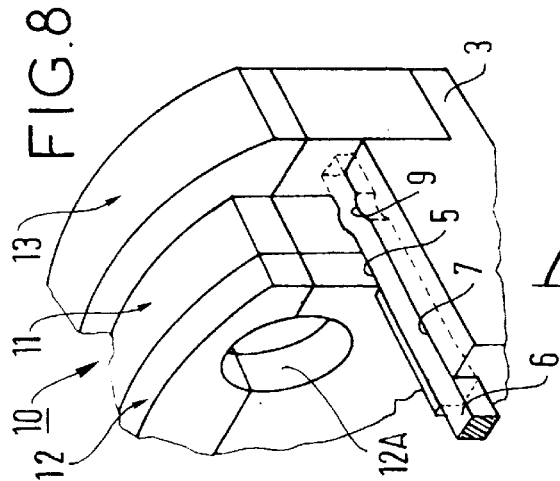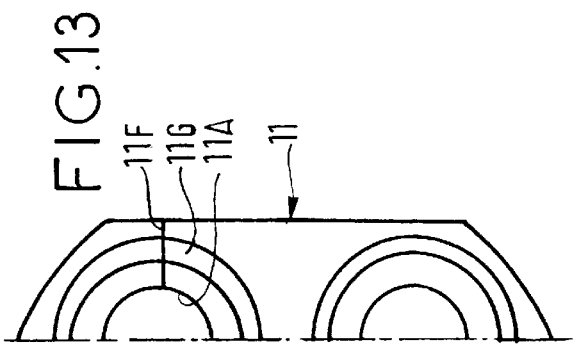

SEALED CABLE JOINT BOX

BACKGROUND OF THE INVENTION

1. Field of the Invention

The present invention concerns a sealed cable joint box having a body, a lid closing the body, cable apertures defined between the body and the closed lid, a joint box seal between the body and the closed lid and a cable seal in each aperture.

2. Description of the Prior Art

Document EP-A-0 637 767 describes a joint box of this kind in which the lid is hinged and locked to the two longer lateral walls of the body. This joint box has individual apertures for the cables on the shorter lateral walls of the body. These apertures are cavities open in the lengthwise direction. Each cavity receives a cable seal in its portion towards the interior of the body and retains the cable in its terminal portion towards the exterior of the body, the cable seal being made in two parts for ease of installation. A joint box seal is provided on each edge of the two longer lateral walls of the body. The cable and joint box seals are deformable. They are compressed by the pressure exerted by the closed lid when locked to the body. They are not continuous around all the periphery of the body, however, so that there is a risk of problems with satisfactory sealing of the joint box.

Document Wo 95/02267 describes a sealed cable joint box in which the lid is also hinged and locked to the two longer lateral walls of the body. This joint box has individual apertures for the cables on one of the shorter lateral walls of the body. These apertures are cavities open longitudinally except in their terminal portion towards the interior of the body where an interior partition in the form of a bridge joins the edges of the two longer lateral walls of the body, over the apertures and enabling the apertures to open into the body. This joint box has a continuous seal substantially at the periphery of the body and mounted on the edges of the two longer walls of the body, its shorter lateral wall with no cable apertures and its interior partition opposite this shorter lateral wall without apertures. A continuous lip is provided at the periphery of the lid, or separate lips, to locate externally of the seal when the lid is closed and thereby to form an obstacle opposing penetration of moisture etc. into the closed joint box. A seal of this kind between the body and the lid is totally independent of the seal provided for each cable in its aperture. AS a result the overall sealing of the joint box may not be satisfactory.

An aim of the present invention is to provide a sealed cable joint box with a continuous seal at its periphery encompassing its cable apertures.

SUMMARY OF THE INVENTION

The present invention consists of a sealed cable joint box including a body, a lid for closing the body, cable apertures between the body and the lid, a first flexible and deformable seal for sealing cables in each aperture, a groove on peripheral edges of the body or the lid and divided into successive sections by the apertures, and a second flexible and deformable seal for sealing said joint box mounted in the groove and correspondingly formed of independent segments each received into one section of the groove and projecting from its lateral edges, wherein each segment of the second seal for sealing the joint box has a terminal portion embedded in the first seal for sealing the cables in the aperture and the first seal has a lower hardness than the second seal so that it is compressed onto the embedded terminal portion of the segment as well as into the aperture and onto the cables to provide a continuous seal with the embedded terminal portion of the segment.

The joint box advantageously also has at least one of the following additional features:

- each section of the groove has a terminal portion parallel to an axial direction of the aperture and to the cables in the aperture and opens directly into the aperture,
- the terminal portions of each section of the groove have ends opening into the two apertures on respective opposite sides of the section and the segment of the second seal in the section projects from the ends of the section into the two apertures,
- the terminal portions of each section of the groove are open lengthwise in the two apertures on respective opposite sides of the section and each has a boss projecting into the groove and towards the aperture,
- the first seal for sealing the cables in each aperture is wafer shaped, having peripheral dimensions matching interior peripheral dimensions of the aperture and a reduced thickness compared to an axial dimension of the aperture, with individual passages for a limited maximal number of cables, and is associated with compression means and has a recess on at least one face of the first seal facing towards the interior of the joint box and through at least part of its thickness for embeddedly receiving one of the terminal portions of one of the segments of the second seal,
- the first seal for sealing the cables has a Shore hardness of not greater than approximately 5 and the second seal for sealing the joint box has a Shore hardness between 20 and 40.

The features and advantages of the present invention will emerge from the following detailed description with reference to the accompanying drawings.

BRIEF DESCRIPTION OF THE DRAWINGS

FIG. 1 is a partly cut away diagrammatic perspective view of a cable joint box of the invention.

FIG. 1A is a fragmentary view to a larger scale repeating part of FIG. 1.

FIG. 2 is a sectional view of a cable sealing device in one aperture of the joint box.

FIG. 3 is a lateral view of the device from FIG. 2.

FIGS. 4 and 5 are front and sectional views of a seal of the device from FIGS. 2 and 3.

FIGS. 6 and 7 are elevation and sectional views of a ring associated with said seal.

FIGS. 8, 9 and 10 are partial views corresponding to FIG. 1A of respective variants.

FIGS. 13, 14. and 15 are fragmentary front views of variants of the deformable seal of the sealing device repeating part of FIG. 4 and relating to the variants of FIGS. 8, 9 and 10.

DETAILED DESCRIPTION OF THE PREFERRED EMBODIMENTS

Figure 11:
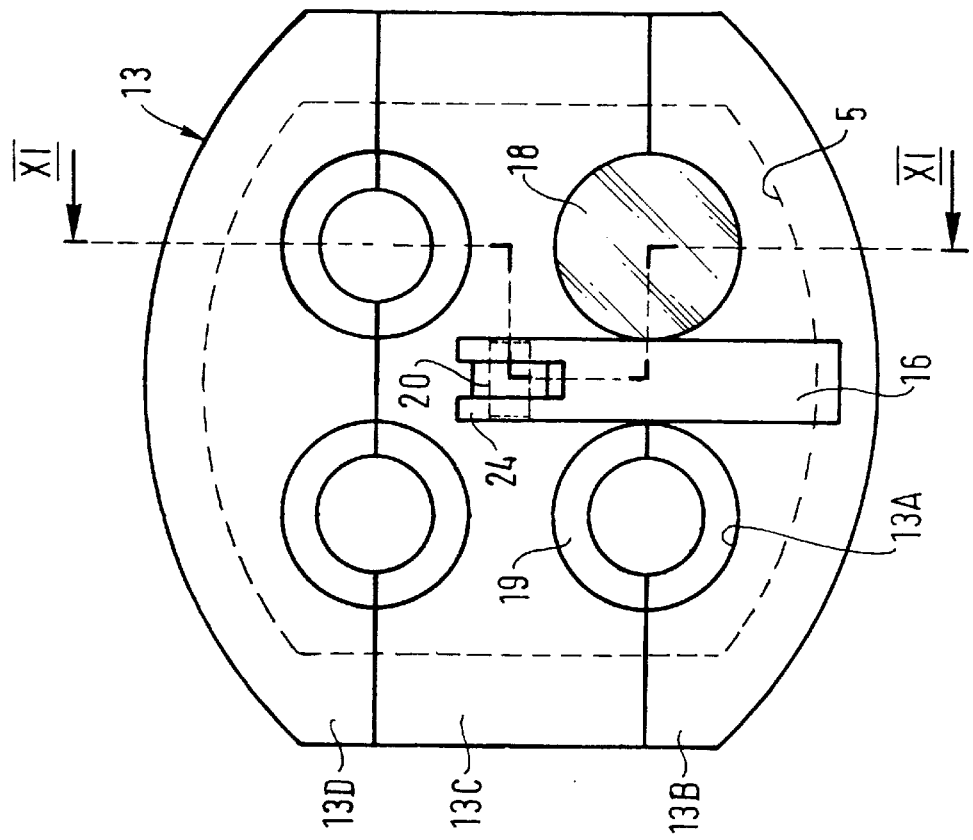
FIGS. 11 and 12 are sectional and lateral views of a variant of the cable sealing device relating to one of the variants of the joint box from FIGS. 8 through 10.

FIG. 1 shows a cable joint box 1. The cables are not shown in this figure. The joint box has a body 3, a lid 4 to close the body and lateral apertures 5 at its opposite ends, each for a plurality of cables. Each aperture is advantageously designed for a limited maximum number of cables having diameters within a wide range.

In the example shown, the joint box is tubular and has inside and outside cross-sections that are circular and truncated by two opposite flats forming the two longer lateral walls of the joint box. It has a single aperture at each end accommodating up to four cables in each aperture which is defined by the facing terminal portions of the body and the lid, each aperture being rendered circular except in its terminal portion towards the interior of the joint box and truncated in its terminal portion on the exterior side. Alternatively, the joint box can have a plurality of apertures at each end defined between the shorter front walls of the body and the lid. Alternatively, each aperture can be designed for a different number of cables, for example two cables, the dimensions and the shape of the joint box being dependent on the number of cables that it can accommodate.

The joint box 1 is fitted with two joint box seals 6 in the form of two identical segments mounted on the edge of the two longer lateral walls of the body 3 in order to be compressed between the body and the lid and a sealing device 10 for the cables accommodated in each aperture, which device is mounted with the cables in the aperture. These two segments or seals 6 and each sealing device 10 are additionally designed to provide a continuous seal where they join.

One of the segments or seals 6 and how it is fitted are described with reference to FIG. 1 and more particularly with reference to FIG. 1A.

This seal 6 is accommodated in a groove 7 on the edge of one of the longer lateral walls of the body and opening into one of the lateral parts of the aperture 5 at each end of the joint box. This aperture has a shoulder 8 at the end of this groove. The seal 6 projects above the groove. Its terminal portion projects from the end of the groove into the sealing device 10. In this embodiment this seal 6 has a circular cross-section, either solid or advantageously axially hollow. It is deformable but preferably has a relatively high hardness, i.e. a Shore hardness between 20 and 40.

The device for sealing the cables in the cable apertures is described with reference to FIGS. 1 and 1A and more particularly with reference to FIGS. 2 and 3.

The device 10 includes a flexible and deformable seal 11, a rigid and mobile compression disk 12, a first rigid and fixed abutment 13 and a second rigid and fixed abutment 14 mounted in the aperture transversely to its axial direction. The seal 11 is mounted between the compression disk and the second fixed abutment. The first fixed abutment 13 is fitted in the terminal portion of the aperture opening to the exterior of the joint box. The second fixed abutment 14 is in the opposite terminal portion of the aperture, towards the interior of the body.

The seal 11 is in the shape of a wafer of reduced thickness compared to the axial length of the aperture and is accommodated with the compression disk 12 in the circular cross-section non-terminal portion of the aperture.

The device also includes an axial rod 15 sliding in the aperture and passing axially through the fixed abutments and the compression disk and the seal between them, and an associated external lever 16 for actuating the compression disk 12 via the rod 15.

The sliding rod is coupled to the compression disk by a spring 17 to compress the seal 11 when the lever is actuated. Alternatively, it can be coupled directly to the compression disk, being attached to the latter, without extending beyond the disk towards the interior of the joint box.

The seal, the compression disk 12 and the first and second fixed abutments 13, 14 have individual passages for the cables that can be accommodated in the aperture. These passages are labeled 1A, 12A, 13A, 14A according to the part concerned. They are aligned in the parts when the latter are in place to define the same number of series of passages for the cables. The passages 12A, 13A, 14A have a diameter slightly greater than the maximal diameter of the cables that can be accommodated in the aperture. On the other hand, the passages 11A have a diameter substantially less than the maximal diameter of the cables. These passages 11A are biconical in shape with the two cones joined at their common smaller base.

The compression disk 12, the first fixed abutment 13 and the second fixed abutment 14 are each made up of several components assembled together, in this example three components 12B, 12C and 12D, 13B, 13C and 13D, and 14B, 14C and 14D, depending on the part concerned. The component 13B of the first fixed abutment is part of the body and is formed by a shoulder at the end of the latter. The components 14B and 14D of the second fixed abutment 14 are respectively part of the body and part of the lid. The passages in the various components of the parts 12 through 14 are semicircular and open, before the components are assembled together, onto the edges at which these parts fit together.

The seal 11 can also be made in several components adapted to be assembled together so that before the various components of the seal are installed in the aperture its passage are open. It is advantageously in one piece, with each of its passages open by virtue of a slit running from the passage to the periphery of the seal, this slit preferably being made when the cable is fitted into the passage and not being made at all if the passage does not accommodate any cable.

A plug 18 is inserted in each series of aligned passages that does not accommodate any cable.

As shown in FIG. 2, two half-spacers 19 are preferably mounted with the cable in each of the passages 13A of the first fixed abutment if the cable diameter is very much less than the diameter of the passage. These two spacers are identical, removable in each half of the passage 13A and match the passage on the outside and the cable on the inside.

They are externally grooved and internally ribbed and the passage 13A is correspondingly ribbed to prevent them slipping in the passage and to retain the cable effectively.

The central part 13C of this first abutment advantageously also acts as a cable clamp for the cable which is accommodated in one of the two passages defined between it and the attached bottom part 13B of the body, whilst the third part 13D of this same first abutment clamps two cables accommodated in the two passages defined between this part 13D and the central part 13C.

The description of the sealing device shown in FIGS. 2 and 3 ends with a description of the actuation of the sliding rod 15 by the lever 16.

In FIGS. 2 and 3, the sliding rod 15 is shown actuated in a "pushed" mode towards the interior of the joint box by actuation of the lever 16.

The first terminal portion of the rod 15, which projects externally of the aperture and of the joint box, bears on a terminal portion of the lever 16. This terminal portion of the lever 16 is coupled by a pivot pin 20 to the central part 13C of the first abutment 13, which to this end has two lugs 21 which retain the lever between them. The peripheral part 22 of this terminal portion of the lever constitutes a cam for actuating the rod. This cam is semicircular but the pivot pin 20 is offset from the center of the cam to obtain the required cam effect. This first terminal portion of the rod has a larger cross-section than its intermediate portion and its second terminal portion, the shoulder at the transition between the two cross-sections being situated in the first fixed abutment 13 and relatively near the end of the first terminal portion.

The spring 17 is mounted on the intermediate portion of the rod 15, between the shoulder at the transition between the two cross-sections of the rod and a shoulder in the axial bore in the compression disk 12. It is housed mainly in the axial bore in the fixed abutment, being captive in the latter and accommodated and locked in the compression disk.

The second end of the rod 15 carries a washer 23 which bears against the second fixed abutment 14 when the lever is in the rest position shown in FIG. 2, at which time the spring is only slightly compressed and the seal 11 is not compressed at all.

When the lever 16 pivots about the pivot pin 20 in the direction of the arrow 26 the cam 22 pushes the end of the rod 15 inwardly of the aperture and the joint box. At the same time the spring 17 is more strongly compressed and pushes on the compression disk 12 to compress the seal 11 strongly and to cause it to flow into the gaps around the cables when fitted and around the plug 18 when fitted. The conjugate action of the pushing by the rod 15 and the reaction of the compressed spring 17 calibrates the force applied by the spring 17 to the compression disk, the spring 17 acting as a declutching system during the entrainment of the compression disk, 12 in particular if large cables are accommodated in the seal.

Referring to FIGS. 4 through 7, the seal 11 includes slits 11F that are made in order to open each of its passages 11A onto the periphery of the seal, 11 unless the passage is not to receive any cable but is to be closed by a plug 18 instead, as is the case in FIGS. 2 and 3. Its passages 11A have their edge flared on each of the two faces of the seal 11 and surrounded by a peripheral rib 11G on each face of the seal 11. The axial bore in the seal 11 for the sliding rod 15 is a small diameter hole 11H.

A diameter matching ring 30 is mounted in one of the passages 11A if the cable to be accommodated in that passage has a diameter very much less than that of the passage. The ring 30 is made of a deformable material of the same or a similar nature to that of the seal. It is diabolo shape, which presents an axial opening 30A adapted to the small diameter cable and a V-shaped cross-sectional periphery 30G (see FIGS. 4–7) matching the shape of the passage and extending as far as the peripheral lip on each face of the seal 11. This ring has a slit 30F which is made in order to fit the cable into the passage fitted with this ring.

This seal 11 and the ring 30 are very flexible and highly deformable. They have a Shore hardness in the order of 5, or even slightly less, so that they provide a very good seal to the cables when fitted, which can have diameters varying by a factor of up to 3 within the range of cable diameters that can be accommodated in the aperture. This low hardness also avoids the application of excessive stresses to the peripheral parts of the aperture.

The ribs at the periphery of the passages 11A in the seal 11 favor deformation of the seal 11 around the cables and the plug 18 when fitted. They also reduce the force needed to compress the seal satisfactorily.

The seal 11 has two circular recesses 11E on one face and extending through a significant part of its thickness. These two recesses 11E are provided for the terminal portions of the two joint box seals when fitted, which are accommodated in these recesses so that they are embedded in the seal 11 when it is deformed and compressed around them. Alternatively, the two recesses 11E can open onto both faces of the seal 11.

The joint box seals, which are deformable but harder than the seal 11, cause the seal 11 to be strongly deformed around the terminal portion of each of them embedded in the seal 11. The "pushed" mode actuation of the compression disk 12 to compress the deformable seal 11 favors perfect embedding of the terminal portion of the joint box seal since the seal 11 is itself "pushed" onto this terminal portion of the joint box seal.

This sealing device 10 is easily and quickly fitted into the aperture and onto the cables accommodated in the latter and to the terminal portions of the two joint box seals when fitted into the grooves on the body.

It is equally easy to demount and can be re-used.

Figure 12:
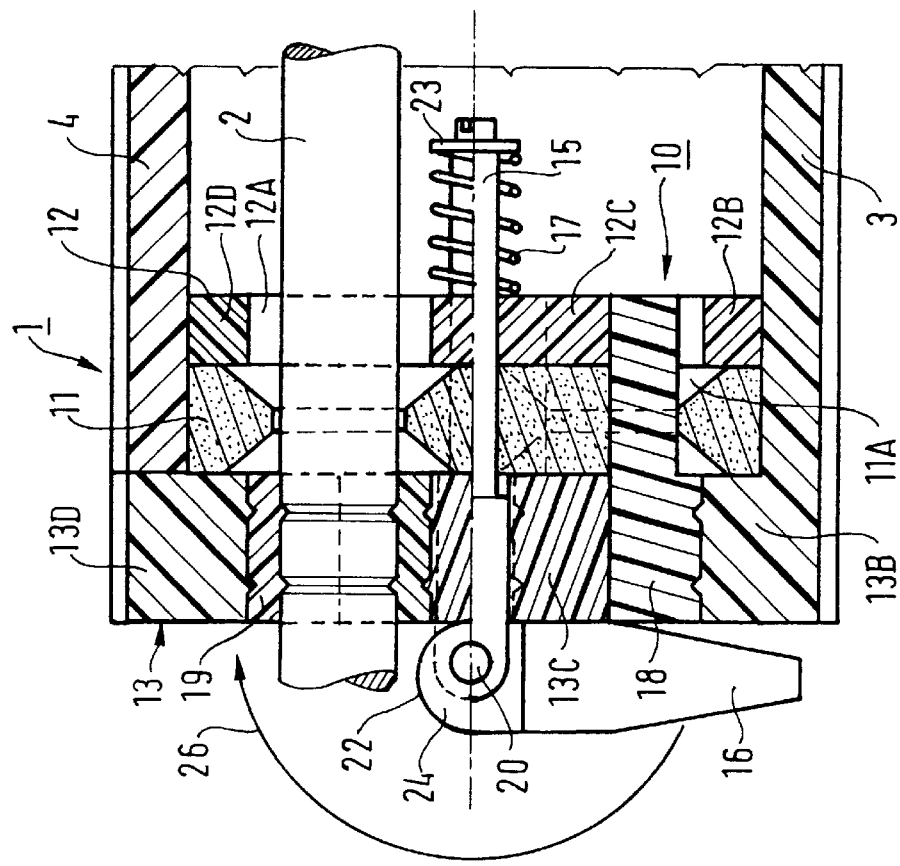

FIGS. 8 through 10 show variants of FIGS. 1 and 1A, and correspond to the variant of the cable sealing device shown in FIGS. 11 and 12 and the variants of the seal 11 of the cable sealing device 10 shown in FIGS. 13 through 15.

In FIGS. 8 through 15 the same reference numbers are used to designate the same components as in FIGS. 1 through 3, and only the differences compared to FIGS. 1 through 3 are explained.

In FIGS. 8 through 10, the aperture 5 has internally two lateral flats each of which is defined half on the body and half on the lid, respectively. Its outside terminal portion is partially truncated. The seal 11 is disposed between the compression disk 12 and the first fixed abutment 13, this first abutment being the only abutment in the aperture. The compression disk 12 and the seal 11 have truncated lateral parts forming two opposite flats which locate against the corresponding flats of each aperture. In FIGS. 8 through 10 the terminal portion of each groove 7 is open lengthwise in the aperture 5 at its interior lateral edge, which is truncated in this terminal portion in this aperture.

In FIG. 8, the groove 7 has an internally projecting boss 9 at the exterior edge of its terminal portion. This boss is centered on the flat of the seal 11. It deforms the joint box seal 6 when fitted into the groove, which has a corresponding re-entrant boss in the flat of the seal 11 and centered widthwise of this flat. The seal 6 is preferably substantially square in cross-section for better anchorage in the seal 11 and operates as a declutching system if large cables pass through this seal.

This seal 11 forming part of the cable sealing device 10 shown in FIG. 8 is that shown in FIG. 13. Alternatively, it can have a recess centered widthwise of each of its opposite flats and adapted to receive the boss formed on the joint box seal 6.

In FIG. 9, the terminal portion of the groove 7 is open lengthwise in the aperture but has no boss on its exterior edge. The seal 11 of this device 10 is that shown in FIG. 14. It has a projecting lug 32 across the width of each of its flats.

This lug has a bore 32A through it parallel to the groove and extending the latter in the axial direction. It is received in the terminal portion of the groove. It has an opening slot 32F along its bore and receives the terminal portion of the seal 6 when fitted into the groove.

In FIG. 10, the terminal portion of the groove is also open lengthwise in the aperture and has no boss on its exterior edge. The seal 11 of this cable sealing device is that shown in FIG. 15. It has a projecting lug 33 across the width of each of its flats, with a semi-cylindrical passage 33A parallel to the groove and extending the latter in the axial direction. It is accommodated in the terminal portion of the groove and receives the terminal portion of the joint box seal 6 in its groove.

In the cable sealing device 10 shown in any one of FIGS. 8 through 10, the sliding rod 15 is preferably actuated in a "pulled" mode towards the exterior of the aperture and of the joint box by the lever 16 when actuated, as described with reference to FIGS. 11 and 12.

The compression disk 12 is in the aperture inwardly of the seal 11 and at the end of the aperture. Only the first fixed abutment 13 is used, providing an abutment for the seal 11 and an abutment for the lever.

The first terminal portion of the rod 15, projecting out of the aperture, is coupled directly to the terminal portion of the lever 16 by the pivot pin 20.

The cross-section of this first terminal portion of the rod is rectangular for this purpose and forms a shoulder on the rod, which is of circular cross-section elsewhere.

The terminal portion of the lever 16 is notched to define two lugs 24 between which is received a first terminal portion of the rod coupled in this way to the lever by the pin 20. The peripheral part of these two lugs 24 defines the cam 22, pressed against the first fixed abutment 13 or to be more precise the central part 13C of the latter.

The second terminal portion of the rod 15 projects beyond the compression disk 12 into the joint box and carries the spring 17, which is fitted around it. This spring 17 is locked against the terminal washer 23 and the compression disk 12 being slightly compressed when the lever is in the rest position shown in FIG. 4.

When the lever 16 is pivoted about the pin 20 in the direction of the arrow 26, the cam 22 is driven against the first abutment 13 and the sliding rod 15 is pulled outwards, against the action of the spring, which is strongly compressed. The compressed spring 17 displaces the compression disk 12 towards the first fixed abutment 13, compressing the seal 11 and acting as a declutching system if large cables pass through this seal.

The present invention has been described with reference to the embodiments shown, but it is obvious that variants of any of the specific means described above can be substituted without departing from the scope of the invention. This applies, for example, to the means for actuating the compression disk 12 for the cable seal, around the cables, in the aperture and over the terminal portion of the joint box seal segments. Specifically, referring to FIGS. 1 through 3, the actuator means can comprise a removable pusher member passing through the lid between the compression disk and the fixed abutment on the exterior side of the aperture, instead of the lever 16 and the associated sliding rod 15 shown in these figures.

The joint box can include a plurality of cable apertures at one or both ends. In this case, it is fitted with a joint box seal segment between two apertures at the same end which has its terminal portions embedded in the cable seals in those two apertures.

What is claimed is:

1. A sealed cable joint box having two opposite ends comprising:
    a body,
    a lid for closing said body,
    a cable aperture provided at each of said ends each cable aperture at each of said ends being provided between facing end portions of said body and said lid, and being able to accommodate a plurality of cables therein,
    a first flexible and deformable seal disposed in each said cable aperture for sealing each of said plurality of cables accommodated in said cable aperture, each first seal being provided with individual cable passages for leading each of said plurality of cables accommodated in said cable aperture into said joint box,
    a peripheral groove provided along peripheral edges of one of said body and said lid, and divided into successive sections by each said cable aperture, and
    a second flexible deformable seal for peripherally sealing said joint box, said second seal being mounted in said groove, said second seal being formed of independent seal segments each received in one of said sections of said groove, and being compressed into said groove by facing peripheral edges of the other of said body and said lid when said lid and said body are joined together to form said joint box,
    wherein said seal segments in each one of said sections of said groove, have opposite seal terminal portions embedded respectively in said first seal in said respective cable aperture on both sides of said sections of said groove, and said first seal has a lower hardness than said second seal, so that said first seal in said cable aperture is compressed onto one of said seal terminal portions embedded therein to provide a continuous sealing action therewith.

2. The joint box as claimed in claim 1, wherein each of said sections of said groove has opposite terminal portions which open directly into said cable aperture located at each of the opposite ends thereof, and are parallel to an axial direction of said cable aperture at said each of the opposite ends and to each of said plurality of cables accommodated therein.

3. The joint box claimed in claim 2, wherein said terminal portions of each of said sections of said groove each have an end opening into said cable aperture at said opposite end and the seal segments in each of said sections of said groove projects from each end of said terminal portions of said one of said sections into said cable aperture at said opposite end.

4. The joint box claimed in claim 3, wherein said terminal portions of each one of said sections of said groove are each open lengthwise in said cable aperture located at the end thereof, and each has an internal boss projecting towards said cable aperture at said opposite end.

5. The joint box claimed in claim 3, wherein said first seal is a wafer shape, and has peripheral dimensions matching interior peripheral dimensions of said cable aperture and a thickness which is less than an axial dimension of said cable aperture, and is provided with a limited number of said individual cable passages, and is associated with compression means in said cable aperture and has a recess on at least one face of said first seal facing towards an interior of said joint box and through at least part of said thickness of said first seal for embeddedly receiving one of said terminal portions of one of said seal segments of said second seal.

6. The joint box claimed in claim 5, wherein said recess constitutes a bore through a lug within the thickness of said first seal and projecting therefrom.

7. The joint box claimed in claim 6, wherein said lug has an open slit lengthwise of said bore.

8. The joint box claimed in claim 5, wherein said recess passes completely through the thickness of said first seal and is open lengthwise to define an arcuate lug in the thickness of said seal first and projecting therefrom.

9. The joint box claimed in claim 5 wherein said first seal has slits between each of said passages and its periphery.

10. The joint box claimed in claim 5, wherein said first seal is in a form of a plurality of components adapted to be assembled together and said passages of said first seal are provided on edges of said components of said first seal adapted to fit together.

11. The joint box as claimed in claim 5, including rings, associated with said first seal, selectively and removably mounted in said cable passages thereof, for matching one of said passages to a cable having a diameter less than that of said one of said cable passages and leading into said joint box.

12. The joint box claimed in claim 11, wherein said rings each have a lengthwise open slit.

13. The joint box claimed in claim 5, wherein said second seal has one of circular cross-section and a substantially square cross-section.

14. The joint box claimed in claim 5, wherein said second seal has a hollow cross-section.

15. The joint box claimed in claim 5, wherein said compression means in said cable aperture includes a compression disk and at least one fixed abutment, mounted transversely in said cable aperture and provided with openings for a limited maximal number of cables in each said cable aperture, a rod axially mounted in said cable aperture, sliding through each abutment and mechanically coupled to said compression disk, and a lever for actuating said compression disk in translation in the axial direction of said cable aperture, said lever being mounted externally of said joint box and coupled to said rod.

16. The joint box claimed in claim 15, wherein said compression disk and each fixed abutment comprise a plurality of components adapted to be assembled together and forming said passages between them.

17. The joint box claimed in claim 15, wherein said at least one fixed abutment is mounted in a terminal portion of said cable aperture opening to an exterior of said joint box and includes adapter rings removably mounted in said openings thereof, to match each of said openings to a diameter of the cable received therein.

18. The joint box claimed in claim 1, wherein said first seal for sealing said cables has a Shore hardness of not greater than approximately 5 and said second seal for sealing said joint box has a Shore hardness between 20 and 40.

* * * * *